United States Patent [19]
Morimoto et al.

[11] 3,879,448
[45] Apr. 22, 1975

[54] 4-HEXENOIC COMPOUNDS

[75] Inventors: Hiroshi Morimoto, Hyogo; Masazumi Watanabe; Isuke Imada, both of Osaka, all of Japan

[73] Assignee: Takeda Chemical Industries, Ltd., Osaka, Japan

[22] Filed: Dec. 13, 1973

[21] Appl. No.: 424,314

Related U.S. Application Data

[62] Division of Ser. No. 295,098, Sept. 5, 1972, Pat. No. 3,825,584, which is a division of Ser. No. 113,773, Feb. 8, 1971, Pat. No. 3,728,362.

[30] Foreign Application Priority Data

Feb. 7, 1970  Japan.............................. 45-10846
Feb. 11, 1970  Japan.............................. 45-11616

[52] U.S. Cl. ...... 260/484 R; 260/396 R; 260/473 F; 260/473 S; 260/484 R; 260/487; 260/488 H; 260/491; 260/520; 260/521 R; 260/535 R; 260/539 R; 260/602; 424/305; 424/308; 424/317

[51] Int. Cl......................... C07c 69/14; C07c 69/66
[58] Field of Search......... 260/488 H, 484 A, 535 R

[56] References Cited
UNITED STATES PATENTS
2,390,335  12/1945  Sobotka et al..................... 260/484

*Primary Examiner*—Vivian Garner
*Attorney, Agent, or Firm*—Wenderoth, Lind & Ponack

[57] ABSTRACT

Compounds of the formula

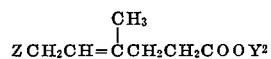

wherein Z is acetoxy or halogen and $Y^2$ is hydrogen or a lower alkyl group, which are useful in preparing quinones having strong anti-inflammatory activity.

3 Claims, No Drawings

4-HEXENOIC COMPOUNDS

This is a division of application Ser. No. 295,098, filed Oct. 5, 1972, now U.S. Pat. No. 3,825,584 which in turn is a division of application Ser. No. 113,773, filed Feb. 8, 1971, now U.S. Pat. No. 3,728,362.

The present invention relates to novel (3-methyl-5-carboxy-2-pentenyl)quinones. More concretely, the present invention provides a quinone derivative of the general formula (I):

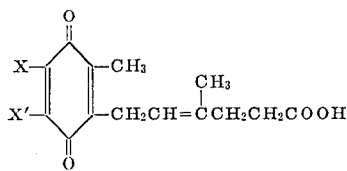

(I)

wherein each of X and X' is independently methyl or methoxy, or alternatively X and X', taken together, represent —CH=CH—CH=CH—; its lower alkyl ester, and its pharmaceutically acceptable salt.

It has been unexpectedly found by the present inventors that the new quinone derivatives have strong anti-inflammatory activity.

Therefore it is the main object of the present invention to provide new compounds which are useful as medicines.

Further, there is provided according to the present invention an industrially feasible method for the production of the above mentioned quinone derivatives, which comprises the first step of condensation reaction between a hydroquinone compound of the general formula (II):

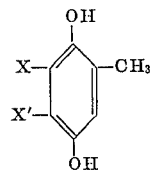

(II)

(wherein each of X and X' has the same meaning as defined above) and a 4-hexenoic compound of the general formula (III$_a$):

(III$_a$)

(wherein Z is hydroxy, acetoxy or halogen, and Y$^2$ is hydrogen or a lower alkyl group or a 5-hexenoic compound of the general formula (III$_b$):

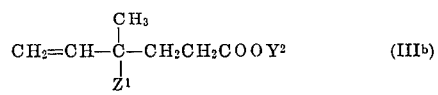

(III$_b$)

(wherein Z' is hydroxy or halogen and Y$^2$ has the same meaning as defined above) to produce a compound of the general formula (IV):

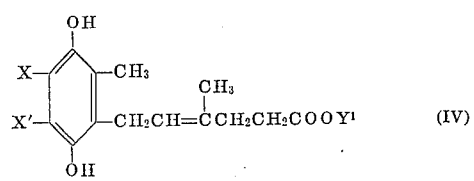

(IV)

(wherein each of X, X' has the same meaning as defined above and Y$^1$ is hydrogen or a lower alkyl group) and the second step of oxidation reaction of thus obtained condensate of the general formula (IV).

The lower alkyl group represented by Y$^1$ and Y$^2$ or that of end product lower alkyl ester may be substituted by a cycloalkyl group making at most 7 carbon atoms in total and is exemplified by methyl, ethyl, n-propyl, i-propyl, n-butyl, i-butyl, s-butyl, t-butyl, n-pentyl, n-hexyl and cyclohexylmethyl.

Halogen atom represented by Z and Z' is exemplified by bromine and chlorine.

The present invention also extends to the hexenoic compounds of the general formulas (III$_a$) and (III$_b$). The compounds (III$_a$) and (III$_b$) are all novel and useful as intermediates for the synthesis of the above mentioned quinone derivatives as well as other medicines such as mycophenolic acid.

The compounds (III$_a$) and (III$_b$) are easily prepared according to per-se known means, for example as follows. The compound of the general formula (V):

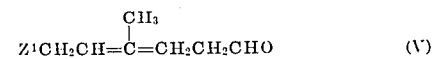

(V)

(wherein Z$^1$ is hydroxy or acetoxy) is produced from geranyl acetate according to per se known means (e.g. ozonization), the compound (V) is oxidized with an oxidizing agent (e.g., air, silver oxide or the like) in a suitable solvent (e.g. ether, petroleum ether, hexane, methanol or the like) at room temperature and if desired the oxidation product is esterified, for example, with diazomethane to obtain a 4-hexenoic compound of the general formula (VI):

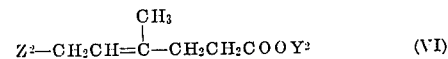

(VI)

(wherein Z$^2$ is hydroxy or acetoxy and Y$^2$ has the same meaning as defined above).

A compound of the general formula (VII):

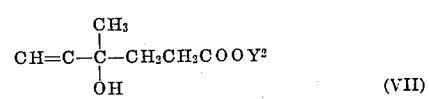

(VII)

(wherein Y$^2$ has the same meaning as defined above) is reduced, for example, by a catalytic reduction using a palladium catalyst (e.g. Pd/CaCO$_3$) at a temperature ranging from 15°C to 30°C to produce a corresponding 5-hexenoic compound of the general formula (VIII):

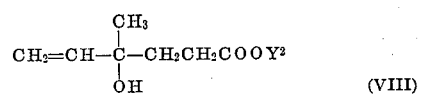

(VIII)

(wherein Y$^2$ has the same meaning as defined above), and of course the compound (VIII) wherein Y$^2$ is hydrogen may be converted into the corresponding lower alkyl ester by an esterification, for example, with an alkyl iodide.

The compound (III$_a$) or (III$_b$) wherein Z or Z' is halogen is prepared according to per se known means, for example, by halogenating the compound (VI) wherein $Z^2$ is hydroxy and $Y^2$ is a lower alkyl group or the compound (VIII) wherein $Y^2$ is a lower alkyl group with a halogenating agent (e.g. phosphorus tribromide, phosphorus trichloride or the like).

In accordance with the method of the present invention, the novel compound (I) is produced by reactions in the following schema

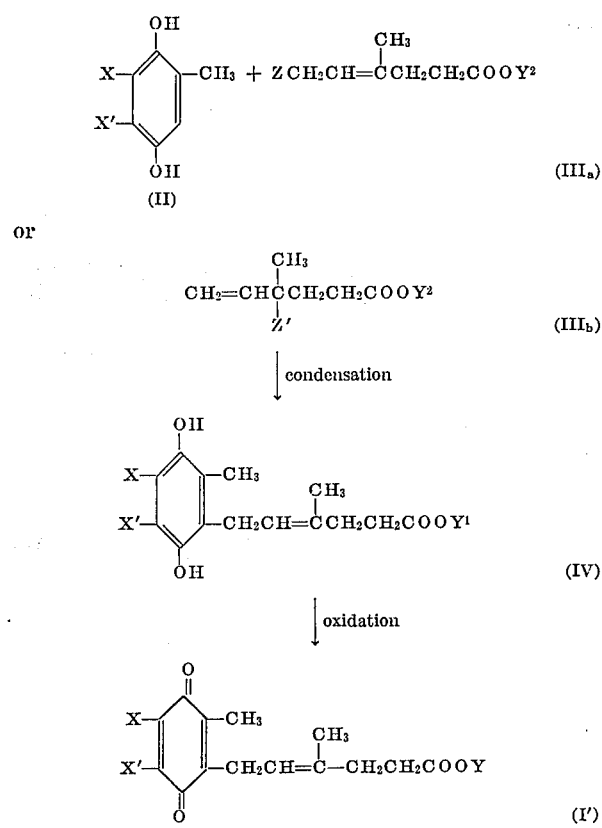

(Y is hydrogen or a lower alkyl group)

The condensation reaction is carried out by reacting hydroquinone compound (II) with olefin compound ($III_a$) or ($III_b$) in the presence of a condensing agent. Hitherto known condensing agents which have been employed for the condensation of a phenol compound with an alcohol are conveniently employable in the reaction of this invention. When Z in the general formula ($III_a$) represents hydroxy or acetoxy or when Z' in the general formula ($III_b$) is hydroxy, as the condensing agent are preferably employed an acid catalyst (e.g. boron trifluoride, zinc chloride or the like) and a sulfinyl, compound (e.g., p-nitrosulfinyl aniline, N-sulfinyl-p-aminobenzoic acid ethyl ester or the like). When Z in the general formula ($III_a$) or Z' in the general formula ($III_b$) is halogen, it is recommended to use a metal catalyst (e.g., copper, tin, palladium, etc.) or an amalgamated metal (the metal component to be amalgamated being copper, tin, palladium, zinc, etc.). The condensation reaction is usually performed in a suitable inert solvent (e.g., ether, tetrahydrofuran, dioxane or the like). The reaction is satisfactorily effected at a temperature ranging from −10°C to 70°C, and the reaction is usually completed in a period ranging from 2 to 10 hours and if desired the reaction time may be shortened by heating the reaction system. After the reaction, the produced condensate (IV) can be isolated according to per se known means (e.g. extraction), but the reaction product (IV) is usually a employed as the starting material for the next oxidation reaction without isolation from the reaction mixture.

The oxidation reaction is usually effected by treating thus formed compound (IV) with an oxidizing agent. In this reaction employable is any known oxidizing agent which has been employed for an oxidation of hydroquinone to benzoquinone, and such as oxidizing agent is exemplified by ferric chloride, manganese dioxide, silver oxide, air and other mild oxidizing agents. The reaction is usually carried out in a suitable inert solvent, which is exemplified by ether, petroleum ether, hexane, methanol, ethanol or the like. The reaction is satisfactorily carried out at room temperature. After the reaction, the desired compound is easily recovered from the reaction mixture according to the per se known means (e.g., concentration, extraction, chromatography, crystallization or the like).

It is to be noted that when $Y^2$ in the any of formulas ($III_a$) and ($III_b$) or $Y^1$ in the formula (IV) is hydrogen, after the condensation reaction or after the oxidation reaction the carboxyl group may be converted to a lower alkyl ester according to per se known means, for example, with an alkylating agent (e.g. diazomethane), that when $Y^2$ in any of formulas ($III_a$) and ($III_b$) or $Y^1$ in the formula (IV) is a lower alkyl group, the lower alkoxy carbonyl group may be converted to a carboxyl group according to a per se known hydrolysis using an alkali (e.g., sodium hydroxide, potassium hydroxide, etc.) after the condensation reaction or oxidation reaction, and that when Y of thus obtained compound (I') is hydrogen, the compound may be converted by per se known means into a pharmaceutically acceptable salt such as a metal salt (e.g. potassium salt, sodium salt, magnesium salt, calcium salt or the like, or amine salt (e.g. dimethylamine salt, diethylamine salt or the like).

These compounds are usually obtained as a mixture of trans-isomer and cis-isomer, and the mixture may be separated by per se known means (e.g. recrystallization, chromatography or the like) into respective isomers, and respective isomers as well as their mixture thereof should be included in the scope of the present invention.

When thus obtained compounds are employed as antiinflammatories, the compounds are usually administered orally in an amount ranging from 25 milligrams to 800 milligrams per day for an adult.

In addition, it is to be noted that 2,3,5-trimethyl-6-(5-carboxy-3-methyl-2-pentenyl)-1,4-benzoquinone, its lower alkyl esters and its salts show α-tocopherol activity, and 2-methyl-3-(5-carboxy-3-methyl-2-pentenyl)-1,4-naphthoquinone, its corresponding lower alkyl esters and its salts give vitamin K activity and therefore that those novel compounds can be used for treating respective vitamin deficiency dieseases in place of natural vitamins. Furthermore, 2,3-dimethoxy-5-methyl-6-(5-carboxy-3-methyl-2-pentenyl)-1,4-benzoquinone, its lower alkyl ester and its salt exert coenzyme Q action.

Furthermore, it is observed that the compounds of the present invention show stabilizing activity of lysosomal membrane and that particularly strong in this biological activity are the compounds wherein each of X and X' is methyl or X and X', taken together represent —CH=CH—CH=CH—.

The following examples will serve to illustrate present invention with no intention of limiting the present invention thereto. In these examples, the parts by weight bear the same relationship to the parts by volume as do grams to millilitres.

EXAMPLE 1

1. 40 parts by weight of geranyl acetate is dissolved into 300 parts by volume of methanol. Through the solution is passed at −78°C one equivalent of ozone to produce the corresponding ozonide. Thus formed ozonide is decomposed by the addition of 20 parts by volume of dimethyl sulfide. The methanol is evaporated under reduced pressure and the residue is distilled under reduced pressure to obtain 19 parts by weight of 6-acetoxy-4-methyl-4-hexenal, boiling at 80° to 85°C/0.4 mmHg as pale yellow oil.

IR $\nu$ cm$^{-1}$ : 2720, 1730(CHO), 1730, 1235 (OCOCH$_3$), 1670(c=c).

2. 0.1 part by weight of 6-acetoxy-4-methyl-4-hexenal is dissolved into 5 parts by weight of 90% aqueous tetrahydrofuran. To the solution is added 0.4 part by weight or argentic oxide (AgO), and the mixture is stirred for 6 hours. The excess of argentic oxide and the precipitated silver metal are collected by filtration, and washed with boiling water. The filtrate and the washings are combined, made acidic by the addition of hydrochloric acid and extracted with ethyl acetate. The extract is washed with water, dried with anhydrous sodium sulfate and concentrated by the evaporation of the solvent to obtain 0.083 part by weight of 6-acetoxy-4-methyl-4-hexenoic acid as colorless oil.

IR $\nu_{max}^{film}$ cm$^{-1}$ : 2650$^{shoulder}$, 1710(COOH), NMR (in CCl$_4$) $\tau$ value: 8.28(=CCH$_3$, singlet), 8.04(COCH$_3$, singlet), 7.62(COCH$_2$, =CCH$_2$, broad), 5.53(OCH$_2$, doublet), 4.69(=CH, triplet), −0.71 (COOH, broad)

Elementary analysis for C$_9$H$_{14}$O$_4$
Calcd. : C, 58.05; H, 7.58
Found: C, 57.76; H, 7.69

3. 0.2 part by weight of 6-acetoxy-4-methyl-4-hexenoic acid is dissolved into 2 parts by volume of ethanol, followed by the addition of a solution of 0.18 part by weight of potassium hydroxide in 1 part by volume of 90% aqueous ethanol under stirring and cooling with ice. The reaction mixture is further stirred for 1 hour and to the reaction mixture is added water, followed by the addition of a dilute hydrochloric acid so as to make the reaction mixture acidic. The acidic mixture is extracted with ethyl acetate. The extract is washed with water, dried with anhydrous sodium sulfate and concentrated by the evaporation of the solvent to obtain 0.15 part by weight of 6-hydroxy-4-methyl-4-hexenoic acid as pale yellow oil. The yield is 97%.

IR $\nu_{max}^{film}$ cm$^{-1}$ : 3350(OH), 2650$^{shoulder}$, 1710 (COOH), 1680(c=c)

NMR(in CDCl$_3$) $\tau$ value: 8.32 (=CCH$_3$, singlet), 7.61(CH$_2$COO, =CCH$_2$, multiplet), 5.87(OCH$_2$, doublet), 4.60(=CH, triplet), 3.37(COOH, OH, broad).

4. 0.192 part by weight of 6-hydroxy-4-methyl-4hexenoic acid is esterified by the use of diazomethane to obtain 0.207 part by weight of methyl 6-hydroxy-4-methyl-4-hexenoate as colorless oil. The yield is 98%.

IR $\nu_{max}^{film}$ cm$^{-1}$ : 3400(OH), 1740, 1165(COOCH$_3$), 1675(c=c)

NMR(in CCl$_4$) $\tau$ value: 8.38 (=CCH$_3$, singlet), 7.70 (CH$_2$COO, =CCH$_2$, multiplet), 6.67 (OH, singlet), 6.43 (COOCH$_3$, singlet), 6.04(OCH$_2$, doublet), 4.71 (=CH, triplet).

Elementary analysis for C$_8$H$_{14}$O$_3$
Calcd. : C, 60.74; H, 8.92
Found : C, 60.55; H, 9.05

EXAMPLE 2

1. 2.2 parts by weight of silver oxide is added into 5 parts by weight of a 10% (weight/volume) of aqueous sodium hydroxide solution. To the reaction mixture is added a solution of 1.6 parts by weight of 6-acetoxy-4-methyl-4-hexenal in 10 parts by weight of methanol under stirring, followed by stirring the resulting mixture for further 1 hour at 20°C. 0.99 part by weight of 6-hydroxy-4-methyl-4-hexenoic acid is obtained from the reaction mixture according to the same procedure as in Example 1(2). The yield is 76%.

2. 0.1 part by weight of methyl 6-hydroxy-4-methyl-4-hexanoate is dissolved into a mixture of 0.1 part by volume of petroleum ether, 0.15 part by volume of ether and 0.05 part by volume of pyridine. To the resultant solution is added 0.05 part by volume of phosphorus tribromide dissolved in petroleum ether, and the mixture is stirred at 0°C for 2 hours. The reaction mixture is poured into water and the mixture is extracted with ether. The ethereal extract is washed with water, dried over anhydrous sodium sulfate and concentrated by the evaporation of ether to obtain methyl 6-brom-4-methyl-4-hexenoate as pale yellow oil.

NMR (in CDCl$_3$) $\tau$ value: 8.27 (=CCH$_3$, singlet), 7.60(=CCH$_2$, CH$_2$COO, singlet), 6.36(COOCH$_3$, singlet), 6.80(BrCH$_2$, doublet), 4.50(=CH, triplet).

Mass Spectrum (m/e): 191(molecular peak −OCH$_3$+2), 189(molecular peak −OCH$_3$), 141(molecular peak −Br), 140(molecular peak −HBr).

EXAMPLE 3

0.02 part by weight of ferric nitrate is added into 43 parts by volume of liquid ammonia, followed by the addition of 3.3 parts by weight of metallic sodium. Then acetlyene gas is passed through the mixture solution at −50°C, until the color of the mixture turns from gray colored into black colored, followed by the addition of 8.3 parts by weights of levulinic acid. The reaction mixture is stood at room temperature to evaporate ammonia and the residue is diluted with water.

The mixture is made acidic by the addition of a dilute hydrochloric acid and thus formed γ-ethynyl-γ-hydroxyvaleric acid is extracted with ether, followed by the addition of diazomethane to obtain γ-ethynyl-γ-hydroxyvaleric acid methyl ester. Ether is evaporated and the residue is dissolved into a 30% methanol aqueous solution. To the solution is added a suspension made from 0.5 part by weight of 5% palladium-barium sulfate, 0.5 part by weight of quinoline and 20 parts by volume of methanol. Through the resultant mixture is passed hydrogen gass under shaking until an equimolar amount of hydrogen gas is consumed. The catalyst is filtered off and methanol is removed under a reduced pressure. The residue is dissolved into ether, washed with a dilute hydrochloric acid to remove the remaining quinoline and dried with anhydrous sodium sulfate. The ether solution is concentrated by the evaporation of ether to obtain 7.8 parts by weight of γ-vinyl-γ-hydroxyvaleric acid methyl ester IR $\nu_{max}^{film}$ cm$^{-1}$ : 3500(OH), 1730, 1200(COOCH$_3$), 1640(c=c)

NMR(in CCl$_4$) τ value: 8.75(CH$_3$—C—O), 8.20(CH$_2$—C—O), 7.67(CH$_2$COO), 7.36(OH), 6.40(COOCH$_3$), 5.00, 4.90 (CH$_2$=), 4.17(CH=)

EXAMPLE 4

To 1 part by weight of γ-vinyl-γ-hydroxyvalerolactone is added 4 parts by volume of a 10% aqueous sodium hydroxide solution under cooling with ice and the resultant mixture is stirred for 1 hour under the same condition. The mixture is made acidic by the addition of a dilute hydrochloric acid while the mixture is cooled, and is extracted with ether. The ether extract is washed with water and to the solution is added diazomethane to produce γ-vinyl- γ-hydroxyvaleric acid methyl ester.

EXAMPLE 5

1. 0.1 part by weight of 2,3-dimethoxy-5-methyl-1,4-benzohydroquinone and 0.087 part by weight of methyl 6-hydroxy-4-methyl-4-hexanoate are dissolved into 5 parts by volume of dioxane. To the solution is added 0.3 part by volume of a 47% boron trifluoride etherate, while the mixture is stirred in a current of nitrogen gas. The stirring is further continued for 6 hours at 20°C. Then the reaction mixture is poured into 10 parts by volume of water and the mixture is extracted three times with 30 parts by volume each of ether. The ether extracts are washed with water, followed by the addition of a solution of 1 part by weight of ferric chloride in 15 parts by volume of methanol, and the resultant mixture is shaken. The ethereal layer is separated, washed with water and dried with anhydrous sodium sulfate. The solvent is evaporated under reduced pressure to obtain 0.15 part by weight of red oil. The oil is separated into two substances by column chromatography using silica gel. Firstly, 0.015 part by weight of the raw material 2,3-dimethoxy-5-methyl-1,4-benzoquinone is recovered and then 0.067 part by weight of trans, cis-2,3-dimethoxy-5-methyl-6-(3-methyl-5-methoxycarbonyl-2-pentyl)-1,4-benzoquinone is obtained.

UV $\lambda_{max}^{EtOH}$ mμ (E$_{1cm}^{1\%}$) : oxidation form 275 (449), reduction form 292 (121)

IR $\nu_{max}^{film}$ cm$^{-1}$ : 1750, 1270, 1200(COOCH$_3$), 1660, 1650, 1615(quinone)

NMR(in CCl$_4$) τ value: 8.34 (cis=CCH$_3$, singlet), 8.28(trans=CCH$_3$, singlet), 8.08(CH$_3$ on the benzene ring, singlet), 8.04 (CH$_3$ on the benzene ring, singlet), 7.70 (trans=CCH$_2$, CH$_2$COO, broad), 7.61 (cis=CCH$_2$, broad), 6.90(CH$_2$ on the benzene ring, doublet), 6.48 (trans COOCH$_3$, singlet), 6.38 (cis COOCH$_3$, singlet), 6.08(2 H$_3$CO, singlet), 5.08 (=CH, triplet).

Mass Spectrum (m/e): 322(molecular peak), 307 (molecular peak-CH$_3$), 291(molecular peak-OCH$_3$), 275, 247, 235, 197

Elementary analysis for C$_{17}$H$_{22}$O$_6$

Calcd. : C, 63.34; H, 6.88

Found : C, 63.41; H, 6.75

2. 0.02 part by weight of trans, cis-2,3-dimethoxy-5-methyl-6-(3-methyl-5-methoxycarbonyl-2-pentenyl)-1,4-benzoquinone and 0.2 part by weight of pyrogallol are dissolved in 2 parts by volume of methanol, followed by the addition of 2 parts by volume of a 10% methanolic potassium hydroxide solution. The resultant mixture is heated at 70°C for 1 hour in a current of nitrogen gas. Then, to the reaction mixture is added ice water, making the mixture acidic by the addition of a dilute hydrochloric acid and extracted with ether. The ether extract is washed with water, followed by the addition of a solution of 1 part by weight of ferric chloride in 10 parts by volume of a 30% aqueous methanol, and the mixture is shaken. The ethereal layer is separated, washed with water and dried with anhydrous sodium sulfate. Ether is evaporated and the residue is purified by a column chromatography using silica gel as adsorbent and a mixture solvent of chloroform and ethanol (9:1) as elute to obtain 0.01 part by weight of trans, cis-2,3-dimethoxy-5-methyl-6-(5-carboxy-3-methyl-2-pentenyl)-1,4-benzoquinone as red oil.

UV $\lambda_{max}^{EtOH}$ μ : oxidation form 275, reduction form 290

IR $\nu_{max}^{CCl_4}$ cm$^{-1}$ : 2650$^{shoulder}$, 1700(COOH), 1660, 1650, 1610(quinone)

NMR(in CCl$_4$) τ value: 8.35(cis=CCH$_3$, singlet), 8.27(trans=CCH$_3$, singlet), 8.09 (CH$_3$ on benzene ring, singlet), 7.72(cis=CCH$_2$CH$_2$COO, broad), 7.60 (trans=CCH$_2$CH$_2$COO, broad), 6.92(CH$_2$ on benzene ring, doublet), 6.12(CH$_3$O, singlet), 5.06(=CH, triplet), −0.06(COOH, broad)

Mass spectrum (m/e): 308(molecular peak), 293, 247, 235

Thus produced trans, cis-2,3-dimethoxy-5-methyl-6-(5-carboxy-3-methyl-2-pentenyl)-1,4-benzoquinone is recrystallized from ether-hexane to obtain trans-2,3-dimethoxy-5-methyl-6-(5-carboxy-3-methyl-2-pentenyl)-1,4-benzoquinone melting at 60 to 65°C as orange crystals.

NMR(in CDCl$_3$) τ value: 8.24(=CCH$_3$, singlet), 8.00 (CH$_3$ on benzene ring, singlet), 7.64(=CCH$_2$, CH$_2$COO, broad), 6.80 (CH$_2$ on benzene ring, doublet), 6.03 (OCH$_3$, singlet), 5.00(=CH, triplet), 0.24(COOH, broad).

Elementary analysis for C$_{16}$H$_{20}$O$_6$

Calcd. : C, 62.32; H, 6.54

Found: C, 62.21; H, 6.61

3. 0.1 part by weight of 2,3-dimethoxy-5-methyl-6-(5-carboxy-3-methyl-2-pentenyl)-1,4-benzoquinone is dissolved into 10 parts by volume of 1.5N ethanolic hydrochloric acid and the solution is stood at 20°C for 15 hours. The reaction mixture is poured into water and extracted with ether. The ethereal extract is washed with water, dried over anhydrous sodium sulfate and concentrated by the evaporation of the solvent. The residue is purified by column chromatography using silica gel to obtain 2,3-dimethoxy-5-methyl-6-(5-ethoxycarbonyl-3-methyl-2-pentenyl)-1,4-benzoquinone as red oil.

UV $\lambda_{max}^{EtOH}$ : 275 mμ.

IR $\nu_{max}^{CHCl_3}$ cm$^{-1}$ : 1730, 1275(COOC$_2$H$_5$), 1660, 1650, 1615(quinone)

NMR(in CCl$_4$) τ value: 8.82 (CH$_3$, triplet), 8.27 (trans=CCH$_3$, singlet), 8.08(CH$_3$ on the benzene ring, singlet), 7.78(=CCH$_2$, CH$_2$COO, broad), 6.94(CH$_2$ on the benzene ring, doublet), 6.14(2 H$_3$CO, singlet), 6.04(CH$_2$OCO, quartet)

Mass Spectrum (m/e): 336 (molecular peak).

EXAMPLE 6

1. 0.174 part by weight of 2-methyl-1,4-naphthohydroquinone is reacted with 0.158 part by weight of methyl 6-hydroxy-4-methyl-4-hexanoate by the same means as in Example 5(1). Thus obtained yellow oil is purified by column chromatography using silica gel as adsorbent and a mixture solvent of benzene and hexane (95:5) as elute to obtain 0.106 part by weight of trans, cis-2-methyl-3-(3-methyl-5-methoxycarbonyl-2-pentenyl)-1,4-naphthoquinone as pale yellow oil.

UV $\lambda_{max}^{EtOH}$ m$\mu$ ($E_{1cm}^{1\%}$): oxidation form 244(562), 248(574), 262(473), 270(508), 330(89); reduction form 245(1114), 271(190), 325(90), 334(90).

IR $\nu_{max}^{film}$ cm$^{-1}$: 1740, 1290(COOCH$_3$), 1660, 1620 (quinone).

NMR(in CCl$_4$) $\tau$ value: 8.36(cis=CCH$_3$, singlet), 8.24 (trans=CCH$_3$, singlet), 7.92(CH$_3$ on benzene ring, singlet), 7.75(cis=CH$_2$CH$_2$COO, singlet), 7.60(trans=CH$_2$CH$_2$COO, broad), 6.75(CH$_2$ on benzene ring, doublet), 6.51(trans form, COOCH$_3$, singlet), 6.40 (cis form, COOCH$_3$, singlet), 5.01(=CH, triplet)

Elementary analysis as C$_{19}$H$_{20}$O$_4$
  Calcd.: C, 73.06; H, 6.45
  Found: C, 72.93; H, 6.37

2. 0.1 part by weight of trans, cis-2-methyl-3-(3-methyl-5-methoxycarbonyl-2-pentenyl)-1,4-naphthoquinone is hydrolyzed with 30% aqueous potassium hydroxide solution in the presence of hydrosulfite and then oxidized with ferric chloride to obtain yellow crystals. The crystals are recrystallized from ether to obtain trans-2-methyl-3-(5-carboxy-3-methyl-2-pentenyl)-1,4-naphthoquinone as yellow needles melting at 130° to 131.5°C.

NMR (in CDCl$_3$) $\tau$ value: 8.23(=CCH$_3$, singlet), 7.89 (CH$_3$ on benzene ring, singlet), 7.70(=CCH$_2$, CH$_2$COO, broad), 6.70(CH$_2$ on benzene ring, doublet), 4.96 (=CH, triplet), −0.20(COOH, broad).

Elementary analysis as C$_{18}$H$_{18}$O$_4$
  Calcd.: C, 72.46; H, 6.08
  Found: C, 72.54; H, 6.00

The mother liquor of the recrystallization is concentrated to obtain crystals. The crystals are recrystallized from ether to obtain cis-2-methyl-3-(5-carboxy-3-methyl-2-pentenyl)-1,4-naphthoquinone as yellow crystals melting at 118° to 119°C.

NMR (in CDCl$_3$) $\tau$ value: 8.30 (=CCH$_3$, singlet), 7.80(CH$_3$ on benzene ring, singlet), 7.45(=CCH$_2$, CH$_2$COOH, singlet), 6.61(CH$_2$ on benzene ring, doublet), 4.92 (=CH, triplet).

Elementary analysis for C$_{18}$H$_{18}$O$_4$
  Calcd.: C, 72.46; H, 6.08
  Found: C, 72.21; H, 6.00

EXAMPLE 7

1. 0.304 part by weight of 2,3,5-trimethyl-1,4-benzohydroquinone is reacted with 0.158 part by weight of methyl 6-hydroxy-4-methyl-4-hexenoate by the same means as in Example 5(1) to obtain 0.217 part by weight of trans, cis-2,3,5-trimethyl-6-(3-methyl-5-methoxycarbonyl-2-pentenyl)-1,4-benzoquinone as pale yellow oil.

UV $\lambda_{max}^{EtOH}$ m$\mu$ ($E_{1cm}^{1\%}$): oxidation form 260(612), 267 (624); reduction form 288(97).

IR $\nu_{max}^{film}$ cm$^{-1}$: 1740, 1300 (COOCH$_3$), 1640, 1620 (quinone)

NMR(in CCl$_4$) $\tau$ value: 8.36 (cis=CCH$_3$, singlet), 8.26(trans=CCH$_3$, singlet), 8.04(CH$_3$ on benzene ring, singlet), 7.74 (cis=CH$_2$CH$_2$COO, broad), 7.60 (trans=CCH$_2$CH$_2$COO, broad), 6.91(CH$_2$ on benzene ring, doublet), 6.45(trans form COOCH$_3$, singlet), 6.38 (cis form COOCH$_3$, singlet), 5.06(=CH, triplet).

Elementary analysis for C$_{17}$H$_{22}$O$_4$
  Calcd.: C, 70.32; H, 7.64
  Found: C, 70.36; H, 7.59

2. 0.063 part by weight of 2,3,5-trimethyl-6-(3-methyl-5-methoxycarbonyl-2-pentenyl)-1,4-benzoquinone and 0.5 part by weight of pyrogallol are dissolved into 1 part by volume of methanol, followed by the addition of 3 parts by volume of a 10% methanolic potassium hydroxide solution, and the mixture is refluxed for 5 hours in a current of nitrogen gas. The reaction mixture is made acidic by the addition of a dilute hydrochloric acid, and extracted with ether. The ethereal extract is washed with water, followed by the addition of a solution of 1 part by weight of ferric chloride in 10 parts by volume of a 30% aqueous methanol, and the resultant mixture is shaken. The ethereal layer is separated, washed with water and dried over anhydrous sodium sulfate. Ether is evaporated and the residue is purified by a column chromatography using silica gel as adsorbent and a mixture solvent of chloroform and ethanol (95:5) as elute to obtain crystals of trans, cis-2,3,5-trimethyl-6-(5-carboxy-3-methyl-2-pentenyl)-1,4-benzoquinone. The crystals are recrystallized from ether-petroleum ether to obtain 0.032 part by weight of the desired compound.

The crystals are again recrystallized from ether-petroleum ether to obtain trans-2,3,5-trimethyl-6-(5-carboxy-3-methyl-2-pentenyl)-1,4-benzoquinone as yellow needles melting at 103° to 104°C.

IR $\nu_{max}^{film}$ cm$^{-1}$: 2650$^{shoulder}$, 1710(COOH), 1640, 1630(quinone)

NMR(in CDCl$_3$) $\tau$ value: 8.20 (=CCH$_3$, singlet), 8.00 (CH$_3$ on benzene ring, singlet), 7.62 (=CCH$_2$, CH$_2$COO, broad), 6.78 (CH$_2$ on benzene ring, doublet), 4.99 (=CH, triplet), 0.75 (COOH, broad)

Elementary analysis for C$_{16}$H$_{20}$O$_4$
  Calcd.: C, 69.54; H, 7.30
  Found: C, 69.65; H, 7.18

The mother liquor obtained in the above recrystallization procedure is concentrated to obtain crystals, which are recrystallized from ether-petroleum ether to obtain cis-2,3,5-trimethyl-6-(5-carboxy-3-methyl-2-pentenyl)-1,4-benzoquinone as yellow plates melting at 102° to 104°C.

IR $\nu_{max}^{film}$ cm$^{-1}$: 2650$^{shoulder}$, 1710(COOH), 1640, 1620(quinone)

NMR (in CDCl$_3$) $\tau$ value: 8.30 (=CCH$_3$, singlet), 8.00 (CH$_3$ on benzene ring, singlet), 7.46(=CCH$_2$, CH$_2$COO, singlet), 6.76(CH$_2$ on benzene ring, doublet), 4.96 (=CH, triplet), −0.60(COOH, broad).

Elementary analysis for C$_{16}$H$_{20}$O$_4$
  Calcd.: C, 69.54; H, 7.30
  Found: C, 69.73; H, 7.62

EXAMPLE 8

1 part by weight of 2,3,5-trimethyl-1,4-benzohydroquinone and 0.8 part by weight of methyl 4-hydroxy-4-methyl-5-hexenoate are dissolved into 30 parts by volume of dioxane. To the mixture is added 2 parts by volume of 47% boron trifluoride etherate in 5 parts by volume of dioxane, while the mixture is stirred in a current of nitrogen gas. The mixture is further stirred for 3 hours at 20°C. The reaction mixture is poured into 50 parts by volume of water, and the mixture is extracted three times with 50 parts by volume each of ether. The ether extracts are washed with water, followed by the addition of a solution of 10 parts by weight of ferric chloride in 100 parts by volume of 50% aqueous methanol, and the resultant mixture is shaken. The ethereal layer is separated, washed with water and dried with anhydrous sodium sulfate. The solvent is evaporated to obtain 1.6 parts by weight of red oil. The oil is subjected to column chromatography using 30 parts by volume of silicic acid. 0.475 part by weight of 2,3,5-trimethylbenzoquinone is recovered by the elution with 400 parts by volume of a mixture of ether and hexane (3:97), and a further elution with 500 parts by volume of a mixture of ether and hexane (8:92) gives 0.709 part by weight of trans, cis-2,3,5-trimethyl-6-(3-methyl-5-methoxycarbonyl-2-pentenyl)-1,4-benzoquinone as yellow oil.

EXAMPLE 9

1.8 parts by weight of 2,3-dimethoxy-5-methyl-1,4-benzohydroquinone and 1.6 parts by weight of methyl 4-hydroxy-4-methyl-5-hexenoate are dissolved in 30 parts by volume of dioxane. Then, to the mixture is added 2 parts by volume of 47% boron trifluoride etherate in a current of nitrogen gas, and the mixture is stirred for 5 hours at 20°C. The reaction mixture is poured into 50 parts by volume of water and is extracted three times with 50 parts by volume each of ether. The ether extracts are washed with water and concentrated under reduced pressure. The residue is dissolved into 10 parts by volume of ether, followed by the addition of a 56% aqueous sodium hydrosulfite solution. To the mixture is added a 30% aqueous potassium hydroxide solution under cooling with ice, and the resultant mixture is stirred for 3 hours. The reaction mixture is poured into water and is extracted with ether. The ether extract is washed with water, followed by the addition of 10 parts by volume of a solution of ferric chloride in 50% aqueous methanol, and the resultant mixture is shaken. The ether extract is separated, washed with ether and dried with anhydrous sodium sulfate. The solvent is evaporated to obtain 1.4 parts by weight of trans, cis-2,3-dimethoxy-5-methyl-6-(5-carboxy-3-methyl-2-pentenyl)-1,4-benzoquinone as red oil.

What is claimed is:
1. A 4-hexenoic compound of the formula

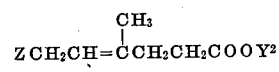

wherein Z is acetoxy and $Y^2$ is hydrogen or lower alkyl.

2. A 4-hexeonic compound as claimed in claim 1, wherein $Y^2$ is hydrogen.

3. A 4-hexenoic compound as claimed in claim 1, wherein $Y^2$ is a lower alkyl.

* * * * *